United States Patent
Kim et al.

(10) Patent No.: US 9,203,229 B2
(45) Date of Patent: Dec. 1, 2015

(54) PROTECTION APPARATUS AND CONTROL METHOD FOR THE SAME

(75) Inventors: Eungjo Kim, Daejeon (KR); Gyubeom Shin, Daejeon (KR); Jaebok Lee, Gimhae-Si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 118 days.

(21) Appl. No.: 14/003,586

(22) PCT Filed: Sep. 11, 2012

(86) PCT No.: PCT/KR2012/007291
§ 371 (c)(1),
(2), (4) Date: Sep. 6, 2013

(87) PCT Pub. No.: WO2013/151217
PCT Pub. Date: Oct. 10, 2013

(65) Prior Publication Data
US 2014/0211352 A1 Jul. 31, 2014

(51) Int. Cl.
H02H 3/22 (2006.01)
H02H 9/00 (2006.01)
H02H 9/04 (2006.01)
H02H 3/08 (2006.01)
H02H 1/06 (2006.01)
H02H 3/093 (2006.01)

(52) U.S. Cl.
CPC . *H02H 3/08* (2013.01); *H02H 1/06* (2013.01); *H02H 3/093* (2013.01)

(58) Field of Classification Search
USPC .......................................... 361/111
See application file for complete search history.

(56) References Cited

U.S. PATENT DOCUMENTS

| 4,330,777 | A | * | 5/1982 | McDuff | 340/635 |
| 4,758,920 | A |   | 7/1988 | McCartney | |
| 5,341,290 | A | * | 8/1994 | Lu | 705/44 |
| 2009/0244800 | A1 |  | 10/2009 | Wedley | |

FOREIGN PATENT DOCUMENTS

| JP | 2006-060917 A | 3/2006 |
| KR | 100695535 B1 | 3/2007 |
| KR | 100981787 B1 | 9/2010 |

OTHER PUBLICATIONS

International Search Report dated Feb. 21, 2013 issued in PCT/KR2012/007291.

* cited by examiner

*Primary Examiner* — Dharti Patel
(74) *Attorney, Agent, or Firm* — Scully, Scott, Murphy & Presser P.C.

(57) ABSTRACT

In a protection apparatus capable of protecting a equipment from an electromagnetic pulse and a control method thereof, the apparatus includes a switching unit configured to electrically connect or disconnect a power line to or from the equipment, a sensing unit configured to detect a current flowing on the power line at a reference time interval, and a controller configured to control the switching unit according to a pulse width of the detected current.

17 Claims, 5 Drawing Sheets

PROTECTION APPARATUS AND CONTROL METHOD FOR THE SAME

TECHNICAL FIELD

The present disclosure relates to a protection apparatus and a control method thereof.

BACKGROUND ART

The widespread use of digital-based electronics has a lot of influence over our lives. Thus, when such electronics are subject to interference, a socially enormous loss may be caused due to repair costs and discontinuity of services using the electronics.

Especially, when communication devices and facilities, which require high security, are disturbed due to Electromagnetic Pulse (EMP), these may cause a national confusion. Therefore, a protection countermeasure therefor should be established.

In the meantime, the EMP may be divided into a nuclear electromagnetic pulse (High Altitude Electromagnetic Pulse (HEMP)), and a non-nuclear electronic pulse (lightening or electromagnetic pulse bomb).

The nuclear electromagnetic pulse is an electromagnetic pulse generated upon nuclear explosion at a high altitude over 30 km, and may be divided into a short pulse, an intermediate pulse and a long pulse according to a rising time. Also, the long pulse of the nuclear electromagnetic pulse is an electromagnetic pulse having a pulse width ranging from one second to hundreds of seconds. The long pulse has a fatal effect on a telecommunication transmission line and a power line of an electronic device, but any method for effectively protecting the electronic device from the long pulse has not be introduced yet.

Therefore, to protect the electronic device from the long pulse, the related art has employed a method of reducing an amount of nuclear electromagnetic pulse coupled to the power line by way of burying the power line underground. However, this may cause several problems in view of repairing the existing power line and spending high cost for constructing the power line.

DISCLOSURE OF THE INVENTION

To achieve these and other advantages and in accordance with the purpose of the present invention, as embodied and broadly described herein, there is provided a protection apparatus for protecting a equipment from an electromagnetic pulse flowing on a power line, the apparatus including a switching unit configured to electrically connect or disconnect the power line to or from the equipment, a sensing unit configured to detect a current flowing on the power line at a reference time interval, and a controller configured to control the switching unit according to a pulse width of the detected current.

In one aspect, the controller may control the switching unit to electrically disconnect the power line from the equipment when the current detected by the sensing unit is an electromagnetic pulse having a pulse width more than a preset time.

In one aspect, the method may further include a power supply unit configured to supply power to the controller, and the power supply unit may continuously supply power to the controller even when the electrical connection between the power line and the switching unit is blocked.

In one aspect, the switching unit may include a first connection portion electrically connected to the power line in a continuous manner, and a second connection portion electrically connected to the power line in a selective manner under control of the controller, and the power supply unit may be disposed near the first connection portion to convert the power supplied from the power line by a preset method so as to supply to the controller.

In one aspect, one end of the power supply unit may be connected in series to a capacitor for protecting the power supply unit from the electromagnetic pulse current flowing on the power line, and the capacitor may be connected in parallel with a discharge resistance for discharging a voltage charged in the capacitor.

In one aspect, the power supply unit may include an emergency power Supply configured to supply emergency power to the equipment, and the controller may control the emergency power Supply and the equipment to be electrically connected to each other when the current detected by the sensing unit is the electromagnetic pulse having the pulse width more than the preset time.

In one aspect, the controller may include a pulse signal processing circuit configured to convert the current detected by the sensing unit into a preset level of voltage, a comparator configured to compare the converted voltage with a reference voltage to determine whether or not the detected current is the electromagnetic pulse having the pulse width more than the preset time, a timer activated to count a preset time according to the determination result, and a switch turned on, in response to the activation of the timer, to generate a control signal for turning the switching unit off such that the electrical connection between the power line and the equipment can be blocked.

In one aspect, the switching unit may include a magnetic switch configured to electrically connect or disconnect the power line to or from the equipment, a driving coil configured to drive the magnetic switch under control of the controller, and a relay configured to drive the driving coil based on the control signal generated by the controller.

In one aspect, the switch may be turned on while the timer counts the preset time, the relay may be turned off in response to the turn-on of the switch so as to prevent an operating current from flowing toward the driving coil, and the magnetic switch may be turned off in response to the flow of the operating current being prevented, so as to block the electrical connection between the power line and the equipment.

In one aspect, the switch may be turned off in response to completion of the counting of the timer, and the relay may be turned on in response to the turn-off of the switch so as to allow the operating current to flow toward the driving coil.

In one aspect, the magnetic switch may include a first connection portion electrically connected to the power line in a continuous manner, and a second connection portion electrically connected to the power line in a selective manner under control of the controller, and the driving coil may be disposed near the first connection portion to receive power supplied via the power line, independent of the blocking of the electrical connection between the power line and the magnetic switch.

In one aspect, one end of the driving coil may be connected in series with a capacitor for protecting the driving coil from the electromagnetic pulse current flowing through the power line, and a compensation resistance for offsetting a vibrational waveform generated due to an inductor component of the driving coil.

In one aspect, the capacitor may be connected in parallel with a discharge resistance for discharging a voltage charged in the capacitor.

In one aspect, the apparatus may further include a short/intermediate pulse protective unit configured to protect the equipment from an electromagnetic pulse, which is contained in the current flowing on the power line and has a pulse width less than a preset time, and the sensing unit may detect a current passed through the short/intermediate pulse protective unit at a reference time interval.

In one aspect, the sensing unit may detect a common mode current flowing on both ends of the short/intermediate pulse protective unit.

To achieve these and other advantages and in accordance with the purpose of the present invention, as embodied and broadly described herein, there is provided a control method for a protection apparatus for protecting a equipment from an electromagnetic pulse flowing on a power line, the method including detecting a current flowing on the power line at a reference time interval, determining whether or not the detected current contains an electromagnetic pulse having a pulse width more than a preset time, and controlling a switching unit to electrically connect the power line to the equipment according to the determination result.

In one aspect, in the control step, a magnetic switch included in the switching unit may be open to block the electrical connection between the power line and the equipment when the detected current contains the electromagnetic pulse having the pulse width more than the preset time.

In one aspect, the determining step may include converting the detected current into a preset level of voltage, and comparing the converted voltage with a reference voltage to determine whether or not the detected current is the electromagnetic pulse having the pulse width more than the preset time.

In one aspect, when the detected current is determined as the electromagnetic pulse having the pulse width more than the preset time, a timer for counting a reference time may be activated, and the magnetic switch included in the switching unit may be open while the reference time is counted.

In one aspect, when the timer completes the counting, the magnetic switch included in the switching unit may be shorted to electrically re-connect the power line to the equipment.

In one aspect, the method may further include supplying emergency power to the equipment in response to the sensing unit detecting a long pulse.

In one aspect, the detecting step may be performed to detect a current flowed through a short/intermediate pulse protective unit, which protects the equipment from an electromagnetic pulse, wherein the electromagnetic pulse may be contained in the current flowing on the power line and have a pulse width less than a preset time.

In one aspect, the controller for controlling the switching unit may be disposed at a front end of the switching unit, irrespective of the electrical connection between the power line and the equipment, so as to continuously receive power supplied from the power line even if the electrical connection between the power line and the magnetic switch of the switching unit is blocked.

MODES FOR CARRYING OUT THE PREFERRED EMBODIMENTS

Embodiments of the present invention will be described below in detail with reference to the accompanying drawings where those components are rendered the same reference number that are the same or are in correspondence, regardless of the figure number, and redundant explanations are omitted. In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

A protection apparatus and a control method thereof in accordance with exemplary embodiments of the present disclosure is to protect an electronic device (or a equipment) from an electromagnetic pulse, which is introduced via a power line and causes a defect of the electronic device. Hereinafter, a method for protecting the electronic device will be described in more detail with reference to the accompanying drawings.

Figure 1:
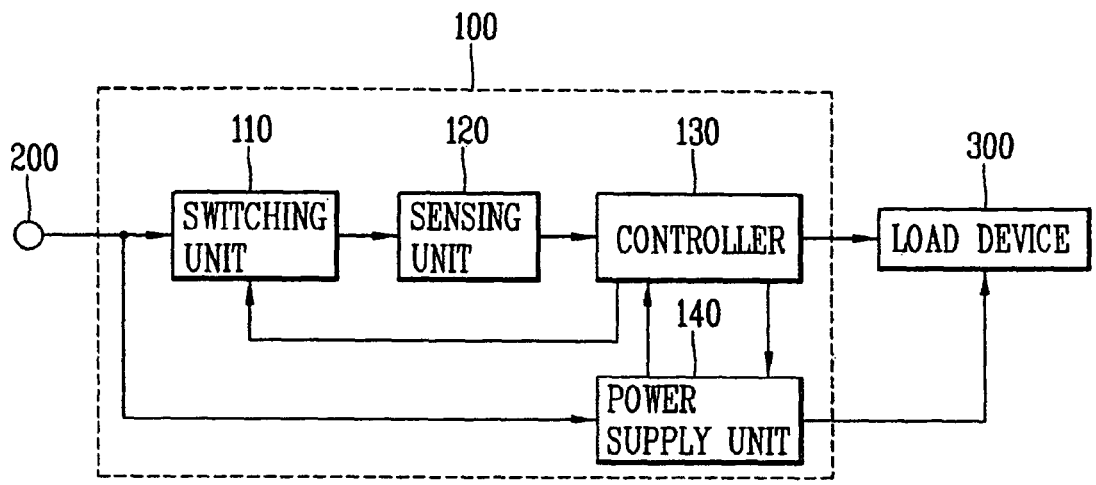
FIGS. 1 and 2 are block diagrams of a protection apparatus in accordance with one exemplary embodiment.
Figure 2:
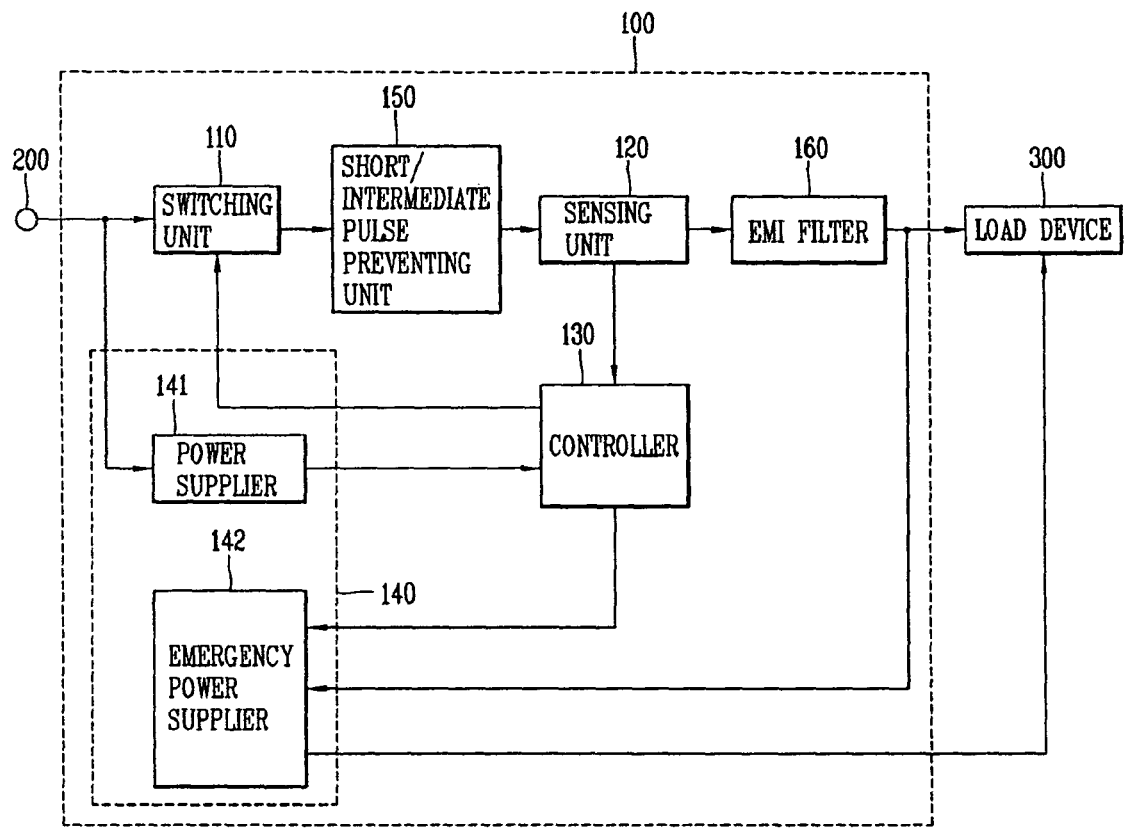
Figure 3:
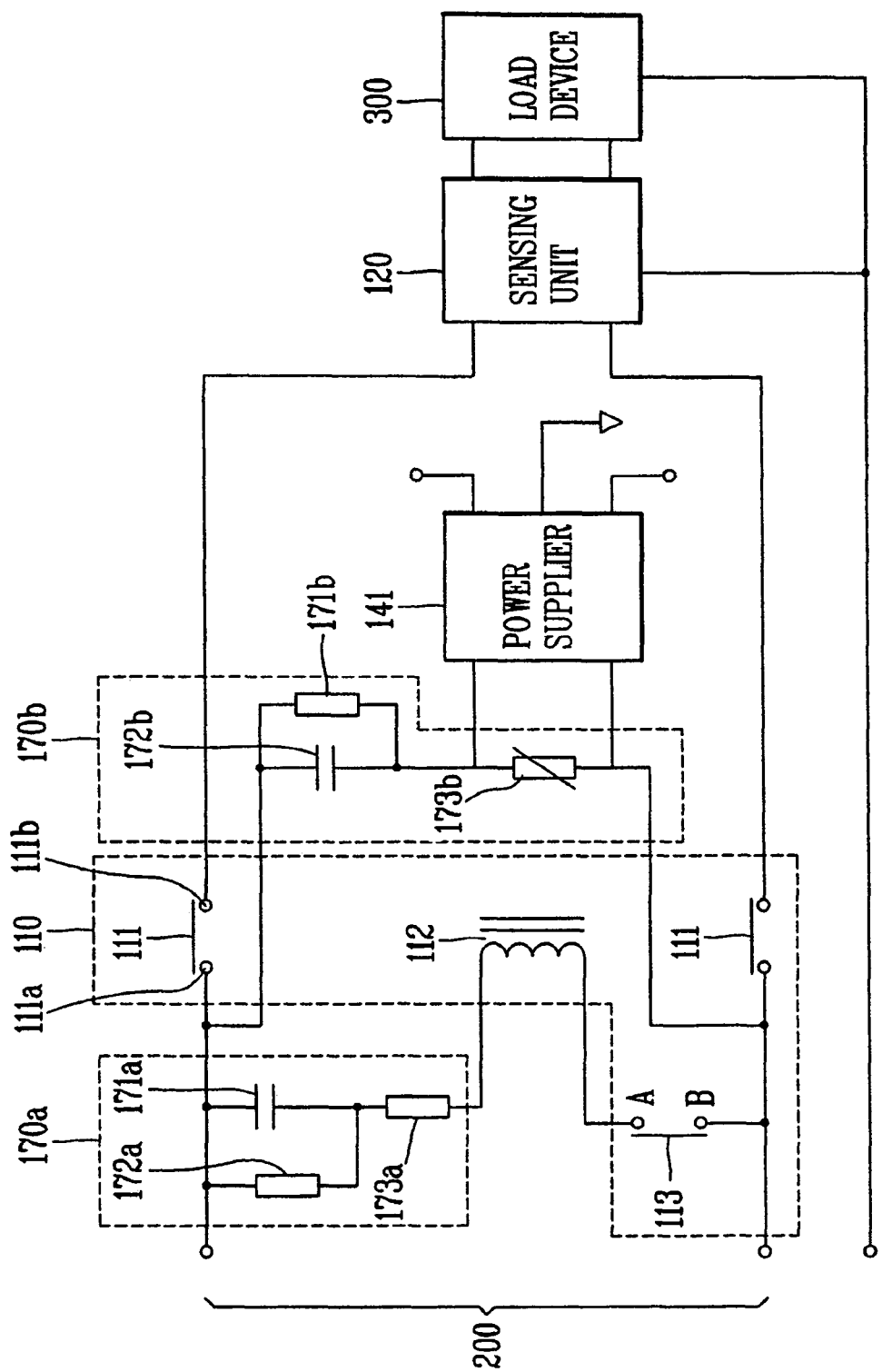
FIGS. 3 and 4 are circuit views of the protection apparatus.
Figure 4:
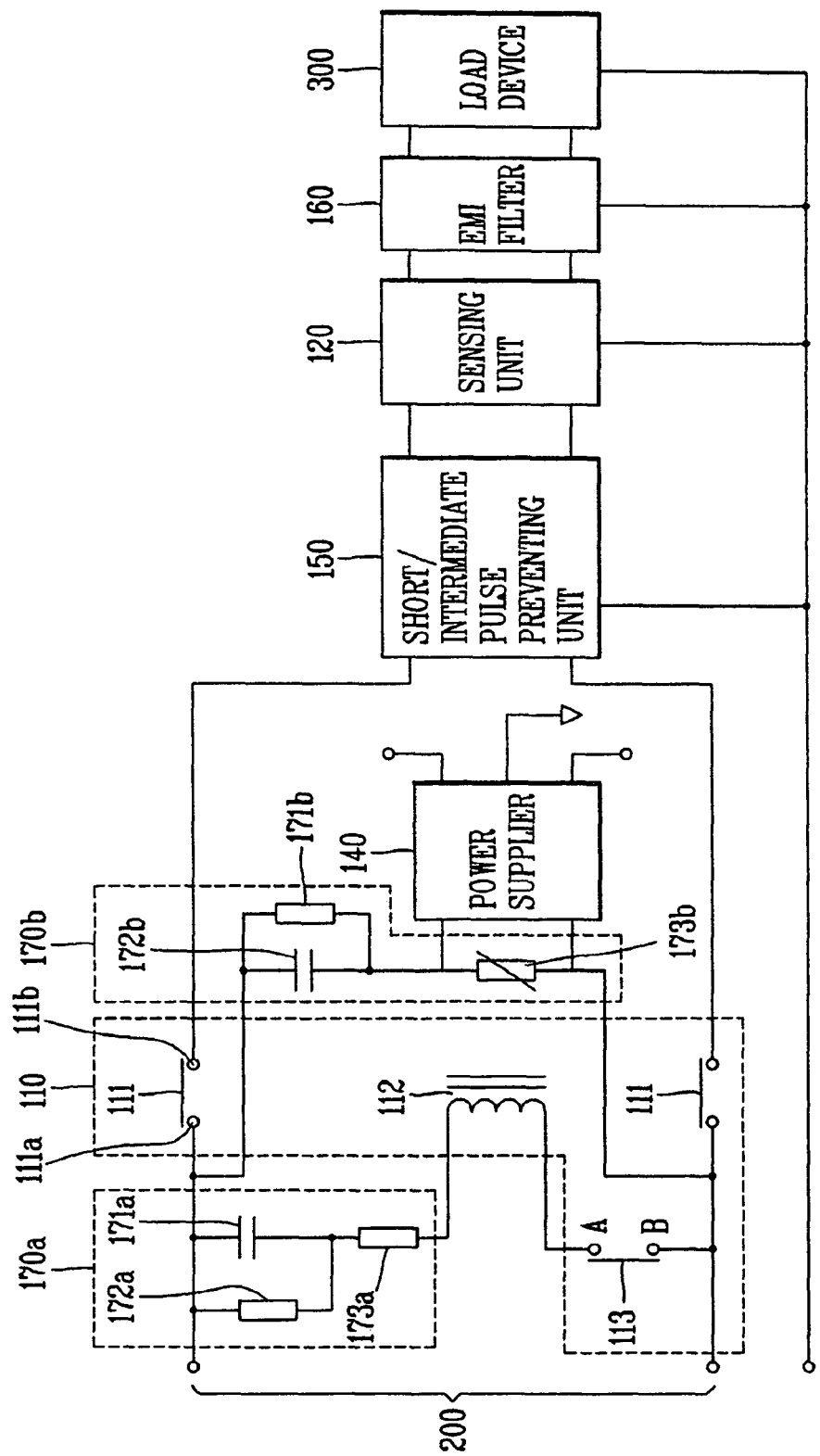
Figure 5:
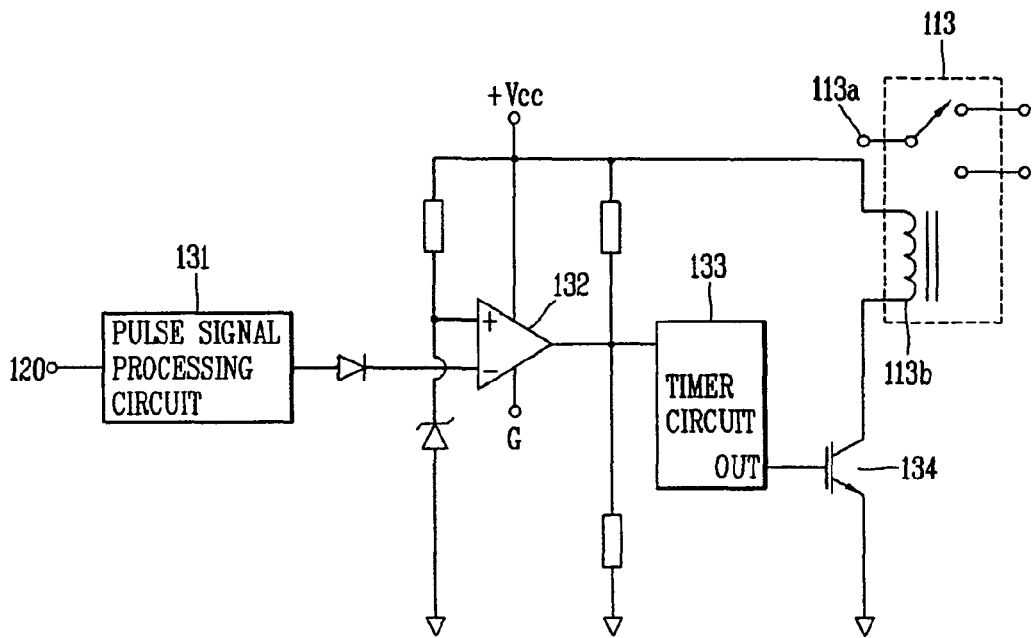
FIG. 5 is a circuit view illustrating a control method for the protection apparatus in accordance with one exemplary embodiment.

FIGS. 1 and 2 are block diagrams of a protection apparatus in accordance with one exemplary embodiment, FIGS. 3 and 4 are circuit views of the protection apparatus, and FIG. 5 is a circuit view illustrating a control method for the protection apparatus in accordance with one exemplary embodiment.

Referring to FIG. 1, a protection apparatus 100 according to the present disclosure may protect a equipment 300 from an electromagnetic pulse, which is contained in a power line and has a pulse width more than a preset time. The protection apparatus 100 may include a switching unit 110, a sensing unit (or detection unit) 120, a controller 130 and a power supply unit 140.

Herein, the power line is a line for supplying power to the protection apparatus 100 and the equipment 300, and acts to carry power supplied from an external power source. For example, referring to FIG. 1, power, which is supplied from the external power source, may be input into an input terminal with a reference numeral '200'. Hereinafter, for the sake of explanation, the power line is represented by the reference numeral '200'.

The electromagnetic pulse having the pulse width more than the preset time is several hundreds of milliseconds in front-of-wave thereof, and several hundreds of seconds in tail-of-wave thereof. The electromagnetic pulse having the pulse width more than the preset time has the pulse width approximately in the range from one second to several hundreds of seconds.

Hereinafter, 'the electromagnetic pulse having the pulse width more than the preset time' will be expressed as 'long pulse' for the sake of explanation.

An electromagnetic pulse current, which is several tens of nanoseconds in front-of-wave and several hundreds nanoseconds in tail-of-wave, will be expressed as a short pulse, and an electromagnetic pulse current which is several microseconds (μs) in front-of-wave is expressed as an 'intermediate pulse'.

Referring to FIG. 1, the switching unit 110 may electrically connect or disconnect the power line 200 to or from the equipment 300.

That is, under the control of the controller 130, the switching unit 110 may be open or shorted so as to deliver power supplied via the power line 200 to the equipment 200 or block the power.

Referring to FIG. 3, the switching unit 110 may include a magnetic switch 111 for allowing or blocking transfer of power supplied to the equipment 300 via the power line 200, a driving coil 112 to drive the magnetic switch 111 under the control of the controller 130, and a relay 113 to drive the driving coil 112 based on a control signal generated by the controller 130 (in the meantime, the relay 113 may also be included as a component of the controller 130, and if so, the function of the relay 113 may also be the same).

The magnetic switch 111, as illustrated in FIG. 3, may include a first connection portion 111a disposed near the power line 200 to be electrically connected to the power line 200 in a continuous manner, and a second connection portion 111b electrically connected to the power line 200 in a selective manner under the control of the controller 130.

Here, the driving coil 112 may be disposed at the side of the first connection portion 111a to always receive power supplied via the power line 200, irrespective of blocking of the electrical connection between the power line 200 and the magnetic switch 111.

The switching unit 110 may further include a protection portion 170a to protect the driving coil 112 from the electromagnetic pulse current.

The protection portion 170a may include a capacitor 171a, and a compensation resistance 173a to offset a vibrational waveform generated due to an inductor component of the driving coil 112. The capacitor 171a and the compensation resistance 173a may be connected to each other in series.

The capacitor 171a may be connected in parallel with a discharge resistance 172a for discharging a voltage charged in the capacitor 171a.

The sensing unit 120 will be described with reference to FIGS. 1 and 3, hereinafter. The sensing unit 120 may detect (sense) a current flowing on the power line 200.

More concretely, the sensing unit 120 may continuously detect the current flowing on the power line 200

The current flowing on the power line 200 may be detected at a reference time interval by the sensing unit 120 under the control of a pulse signal processing circuit 131, which may be provided in the controller 130. The reference time interval may be controllable by a user selection or the controller 130.

The sensing unit 120 may be implemented by use of a type of a hall sensor, for example. The sensing unit 120 may detect a common mode current flowing on both ends of the power line 200 at the same time.

The controller 130 may control the switching unit 110 based on the pulse width of the current detected by the sensing unit 120.

The controller 130 may control the switching unit 110 to block the current flowing through the power line 200 from being transferred to the equipment 300 when the current detected by the sensing unit 130 is an electromagnetic pulse having a pulse width more than a preset time, namely, when the detected current is a long pulse.

Hereinafter, the configuration of the controller 130 will be described in more detail with reference to FIG. 5. The controller 130 may include a pulse signal processing circuit 131, a comparator 132, a timer 133, and a switch 134.

The pulse signal processing circuit 131 may convert the current detected by the sensing unit 120 (see FIGS. 1 and 3) into a preset level of voltage.

That is, the pulse signal processing circuit 131 may act to convert a current level into a voltage level in order to compare the detected current with a comparative voltage (reference voltage).

The comparator 132 may compare the voltage converted by the pulse signal processing circuit 131 with a reference voltage corresponding to a long pulse, thereby determining whether or not the detected current is the long pulse.

The comparator 132 may be implemented as an Operational Amplifier (OP AMP).

Next, the timer 133 may be activated according to a comparison result between the voltage level of the detected current and the voltage level of the reference voltage.

That is, the timer 133 may be activated when the detected current is determined to be the long pulse, and then start counting of a preset time.

In response to the activation of the timer 133, the switch 134 may generate a control signal to block the electrical connection between the power line 200 (see FIG. 1) and the equipment 300 (see FIG. 1). The control signal may be generated as the switch 134 is turned on while the timer 133 is counting the preset time.

When the switch 134 is turned on, the magnetic switch 111 of the switching unit 110 may be open to prevent the power line 200 from being electrically connected to the equipment 300.

That is, the relay 113 of the switching unit 110 (see FIGS. 1 and 3) may be connected to the switch 134 and open in response to the switch 134 being turned on.

As such, when contacts of the relay 113 are open, an operating current may be blocked from flowing toward the driving coil 112 of the switching unit 110. In turn, contacts of the magnetic switch 111 are open, and accordingly the electrical connection between the power line 200 and the equipment 300 may be blocked.

That is, the magnetic switch 111 of the switching unit 110 is open (turned off) while the timer 133 is counting the preset time, so as to prevent an introduction of the long pulse into the equipment 300.

When the timer 133 (see FIG. 5) has completely counted the preset time, the switch 134 (see FIG. 5) is turned off. In turn, the relay 113 is turned on again so as to allow the operating current to flow toward the driving coil 112 (see FIG. 3).

When the operating current is introduced into the driving coil 112, the magnetic switch 111 is shorted (or turned on) so as to electrically connect the power line 220 to the equipment 300. This may allow power transferred via the power line 200 to be supplied to the equipment 300.

As described above, the switching unit 110 may be open (or turned off) while the timer 133 is counting the preset time, thereby blocking the electrical connection between the power line 200 and the equipment 300.

The power supply unit 140 (see FIG. 1) will now be described. The power supply unit 140 may supply power to the controller 130.

Referring to FIG. 3, the power supply unit 140 may be connected to the side of the first connection portion 111a of the magnetic switch 111, thus to continuously supply power to the controller 130 even when the electrical connection between the magnetic switch 111 and the power line 200 is blocked.

Also, a power Supply 141 of the power supply unit 140 may convert the power supplied via the power line 200 by a preset method so as to supply operating power to the controller 130.

Here, the preset method may indicate a conversion from Alternating Current (AC) power into Direct Current (DC) power, for example. Here, the power Supply 141 may include an AC/DC converter.

The power supply unit 140 may further include an emergency power Supply 142 to guarantee a continuous operation of the equipment 300 when the electrical connection between the power line 200 and the equipment 300 is blocked.

The emergency power Supply 142 may be electrically connected to the equipment 300, under control of the controller 130, to supply the operating power to the equipment 300 when the current detected by the sensing unit 120 is the long pulse.

The power supply unit 140, as illustrated in FIG. 3, may further include a protection portion 170b to protect the power supply unit 140 from the electromagnetic pulse current flowing through the power line 200.

The protection portion 170b may include a capacitor 171b connected to the power supply unit 140 in series. The capacitor 171b may be connected in parallel with a discharge resistance 172b to discharge a voltage charged in the capacitor 171b.

The protection portion 170b may further include a Metal Oxide Varistor (MOV) element 173b connected to both ends of the power supply unit 140. The MOV device 173b may protect the power supply unit 140 from an electromagnetic pulse transient voltage.

As described above, the protection apparatus may selectively block the electrical connection between the power line and the equipment, to protect the equipment from a long pulse introduced via the power line.

In the meantime, the protection device 100, as illustrated in FIGS. 2 and 4, may further include a short/intermediate pulse protective unit 150 to protect the equipment 300 from at least one of the short pulse and the intermediate pulse.

The short/intermediate pulse protective unit 150 may prevent or remove the short pulse and the intermediate pulse to protect the equipment 300 from a transient signal or transient voltage, which is generated by an electromagnetic pulse having a pulse width less than a preset time.

As illustrated in FIGS. 2 and 4, when the protection apparatus 100 further includes the short/intermediate pulse protective unit 150, the sensing unit 120 may detect a current flowed through the short/intermediate pulse protective unit 150.

That is, the sensing unit 120 of the protection apparatus 100 may detect the current passed through the short/intermediate pulse protective unit 150, thereby detecting a long pulse from a current, from which the short pulse and the intermediate pulse introduced via the power line have all been removed.

The sensing unit 120 may detect a common mode current, which flows on both ends of the short/intermediate pulse preventing portion 150.

Also, the protection apparatus 100, as illustrated in FIGS. 2 and 4, may further include an Electromagnetic Interference (EMI) filter 160. The EMI filter 160 may act to remove unnecessary electromagnetic signals or electromagnetic noise introduced into the equipment 300.

As described above, the protection apparatus according to the present disclosure may prevent an introduction of the electromagnetic pulse into the equipment by detecting the electromagnetic pulse current flowing on the power line and physically blocking the electrical connection between the power line and the equipment when the detected current corresponds to the long pulse.

Hereinafter, description will be given of a control method for a protection apparatus detecting a long pulse using the aforementioned protection apparatus, with reference to the accompanying drawings.

Figure 6:
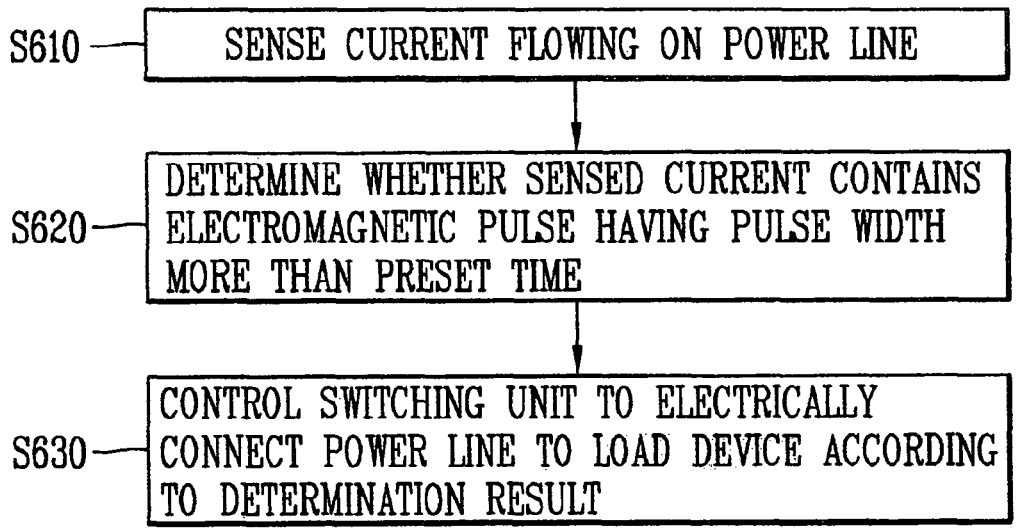
FIGS. 6 and 7 are flowcharts illustrating a control method for a protection apparatus in accordance with one exemplary embodiment.
Figure 7:
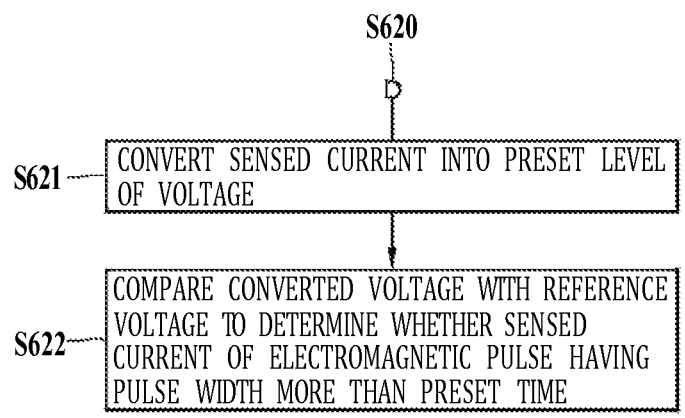

FIGS. 6 and 7 are flowcharts illustrating a control method for a protection apparatus in accordance with one exemplary embodiment.

First, to detect a long pulse flowing on the power line, the control method for the protection apparatus may include detecting an electromagnetic pulse current flowing on the power line (S610).

Here, the power line and the equipment, as illustrated in FIGS. 1 to 4, are electrically connected to each other using the magnetic switch of the switching unit.

In the detecting step (S610), a current, which is contained in the electromagnetic pulse current flowing on the power line and has a pulse width less than a preset time, namely, a current which has flowed through a short/intermediate pulse protective unit (see FIGS. 2 and 4) for protecting the equipment from at least one of a short pulse and an intermediate pulse.

Also, in the detecting step (S610), the current flowing on the power line may be detected at a preset time interval or in a consecutive manner.

When the current flowing on the power line is detected in the step S610, it is determined whether or not the detected current contains an electromagnetic pulse having a pulse width more than a preset time, namely, a long pulse (S620).

More concretely, in the determining step (S620), as illustrated in FIG. 7, to compare the detected current with a reference voltage, a current level of the detected current is converted into a voltage level (or the detected current is converted into a preset level of voltage) (S621).

When the detected current is converted into the voltage level in the step S621, the voltage level of the detected current is compared with the reference voltage so as to determine whether or not the detected current corresponds to the long pulse (S622). In that, when the detected current is converted into the voltage level in the step S621, A comparison is made between the converted voltage and the reference voltage to determine whether sensed current is long pulse HEMP or not.

According to the determination result, the controller controls the switching unit, which electrically connects the power line and the equipment to each other (S630).

In the control step (S630), when the detected current is determined to be the long pulse, a control signal, which shorts the magnetic switch of the switching unit for electrically connecting the power line to the equipment, is generated.

Accordingly, in the control step (S630), when the long pulse is detected on the power line, the switching unit may be open to protect the equipment from the long pulse.

In the meantime, in the control step (S630), when the detected current is a long pulse having a pulse width more than a preset time, a timer for counting a reference time is activated. The magnetic switch of the switching unit is then open while the reference time is counted, thereby electrically disconnecting the power line from the equipment.

Also, in the control step (S630), when the timer has completely counted the reference time, a control signal for shorting the magnetic switch of the switching unit is generated so as to electrically connect the power line to the equipment.

Therefore, when the counting of the reference time is completed, the equipment and the power line are electrically re-connected to each other. This allows the equipment to receive power supplied from the power line.

In the meantime, the control method for the protection apparatus may include supplying emergency power to the equipment in response to the magnetic switch of the switching unit being open by the control signal. As such, the equipment may continuously receive power through the step of supplying the emergency power even when the electrical connection to the power line is blocked.

As described above, in accordance with the protection apparatus and the control method thereof according to the exemplary embodiments, an electromagnetic pulse current flowing on a power line may be detected, and an electrical connection between the power line and the equipment may be blocked when an electromagnetic pulse corresponding to a long pulse is detected from the detected current, thereby preventing the electromagnetic pulse from being introduced into the equipment.

Also, in accordance with the protection apparatus and the control method thereof according to the exemplary embodiments, the equipment can be effectively protected from every electromagnetic pulses corresponding a short pulse, an intermediate pulse and the a long pulse by detecting a current which has flowed through a short pulse and intermediate pulse preventing circuit.

The invention claimed is:

1. A protection apparatus for protecting an equipment from an electromagnetic pulse flowing on a power line, the apparatus comprising:
   a switching unit configured to electrically connect or disconnect the power line to or from the equipment;
   a short/intermediate pulse protective unit configured to protect the equipment from an electromagnetic pulse having a pulse width less than a preset time, the electromagnetic pulse contained in the current flowing on the power line;
   a sensing unit configured to detect a current passed through the short/intermediate pulse protective unit among a current flowing on the power line at a reference time interval; and
   a controller configured to control the switching unit to electrically disconnect the power line from the equipment when the current detected by the sensing unit is an electromagnetic pulse having a pulse width more than a preset time.

2. The apparatus of claim 1, further comprising a power supply unit configured to supply power to the controller,
   wherein the power supply unit continuously supplies power to the controller even when the electrical connection between the power line and the switching unit is blocked.

3. The apparatus of claim 2, wherein the switching unit comprises:
   a first connection portion electrically connected to the power line in a continuous manner; and
   a second connection portion electrically connected to the power line in a selective manner under control of the controller,
   wherein the power supply unit is disposed near the first connection portion and configured to convert the power supplied from the power line by a preset method so as to supply to the controller.

4. The apparatus of claim 3, wherein one end of the power supply unit is connected in series to a capacitor, the capacitor protecting the power supply unit from the electromagnetic pulse current flowing on the power line,
   wherein the capacitor is connected in parallel with a discharge resistance for discharging a voltage charged in the capacitor.

5. The apparatus of claim 2, wherein the power supply unit comprises an emergency power Supply configured to supply emergency power to the equipment,
   wherein the controller controls the emergency power Supply and the equipment to be electrically connected to each other when the current detected by the sensing unit is the electromagnetic pulse having the pulse width more than the preset time.

6. The apparatus of claim 1, wherein the controller comprises:
   a pulse signal processing circuit configured to convert the current detected by the sensing unit into a preset level of voltage;
   a comparator configured to compare the converted voltage with a reference voltage to determine whether or not the detected current is an electromagnetic pulse having a pulse width more than a preset time;
   a timer activated to count a preset time according to the determination result; and
   a switch turned on, in response to the activation of the timer, to generate a control signal for turning the switching unit off such that the electrical connection between the power line and the equipment can be blocked.

7. The apparatus of claim 6, wherein the switching unit comprises:
   a magnetic switch configured to electrically connect or disconnect the power line to or from the equipment;
   a driving coil configured to drive the magnetic switch under control of the controller; and
   a relay configured to drive the driving coil based on the control signal generated by the controller.

8. The apparatus of claim 7, wherein the switch is turned on while the timer counts the preset time,
   wherein the relay is turned off in response to the turn-on of the switch so as to prevent an operating current from flowing toward the driving coil, and
   wherein the magnetic switch is turned off in response to the flow of the operating current being prevented, so as to block the electrical connection between the power line and the equipment.

9. The apparatus of claim 8, wherein the switch is turned off in response to completion of the counting of the timer, and
   wherein the relay is turned on in response to the turn-off of the switch so as to allow the operating current to flow toward the driving coil.

10. The apparatus of claim 7, wherein the magnetic switch comprises:
    a first connection portion electrically connected to the power line in a continuous manner; and
    a second connection portion electrically connected to the power line in a selective manner under control of the controller,
    wherein the driving coil is disposed near the first connection portion to receive power supplied via the power line, independent of the blocking of the electrical connection between the power line and the magnetic switch.

11. The apparatus of claim 7, wherein one end of the driving coil is connected in series with a capacitor for protecting the driving coil from the electromagnetic pulse current flowing through the power line, and a compensation resistance for offsetting a vibrational waveform generated due to an inductor component of the driving coil.

12. The apparatus of claim 11, wherein the capacitor is connected in parallel with a discharge resistance for discharging a voltage charged in the capacitor.

13. The apparatus of claim 1, wherein the sensing unit detects a common mode current flowing on both ends of the short/intermediate pulse protective unit.

14. A control method for a protection apparatus for protecting an equipment from an electromagnetic pulse flowing on a power line, the method comprising:
- detecting a current flowing on the power line at a reference time interval;
- determining whether or not the detected current contains an electromagnetic pulse having a pulse width more than a preset time; and
- controlling a switching unit to electrically connect the power line to the equipment according to the determination result,
- wherein
- in the control step, a magnetic switch included in the switching unit is open to block the electrical connection between the power line and the equipment when the detected current contains the electromagnetic pulse having the pulse width more than the preset time;
- the determining step comprises converting the detected current into a preset level of voltage;
- and comparing the converted voltage with a reference voltage to determine when the detected current is the electromagnetic pulse has the pulse width more than the preset time in order to activate a timer for counting a reference time and opening the magnetic switch included in the switching unit while the reference time is counted; and
- the magnetic switch included in the switching unit is shorted when the timer completes the counting to electrically re-connect the power line to the equipment.

15. The method of claim 14, further comprising:
- supplying emergency power to the equipment in response to the sensing unit detecting a long pulse.

16. The method of claim 14, wherein the detecting step is performed to detect a current flowed through a short/intermediate pulse protective unit, the short/intermediate pulse protective unit protecting the equipment from an electromagnetic pulse having a pulse width less than a preset time, the electromagnetic pulse being contained in the current flowing on the power line.

17. The method of claim 14, wherein the controller for controlling the switching unit is disposed at a front end of the switching unit, irrespective of the electrical connection between the power line and the equipment, so as to continuously receive power supplied from the power line even if the electrical connection between the power line and the magnetic switch of the switching unit is blocked.

* * * * *